United States Patent [19]

Lambert et al.

[11] Patent Number: 5,311,849
[45] Date of Patent: May 17, 1994

[54] CARBURETOR ASSEMBLY FOR AN INTERNAL COMBUSTION GAS ENGINE

[75] Inventors: John E. Lambert, Dublin; Larry E. Schluer, Sugar Grove; Douglas Dickson, Columbus, all of Ohio

[73] Assignee: Gas Research Institute, Chicago, Ill.

[21] Appl. No.: 914,360

[22] Filed: Jul. 14, 1992

[51] Int. Cl.⁵ .................... F02D 9/08; F02M 21/04
[52] U.S. Cl. .................... 123/337; 123/361; 123/527; 123/179.15
[58] Field of Search ............... 123/337, 361, 399, 403, 123/527, 179.15, 179.16

[56] References Cited

U.S. PATENT DOCUMENTS

| | | | |
|---|---|---|---|
| 3,741,737 | 6/1973 | Jones | 123/527 |
| 3,943,851 | 3/1976 | Inada et al. | 101/127.1 |
| 4,181,288 | 1/1980 | Bylsma | 251/133 |
| 4,327,894 | 5/1982 | Ewing et al. | 251/233 |
| 4,480,367 | 11/1984 | Johnson et al. | 29/157.1 |
| 4,546,338 | 10/1985 | Idogaki et al. | 335/229 |
| 4,561,158 | 12/1985 | Johnson et al. | 29/156.4 |
| 4,601,271 | 7/1986 | Ejiri et al. | 123/361 |
| 4,649,880 | 3/1987 | Asano et al. | 123/399 |
| 4,698,535 | 10/1987 | Shiraki et al. | 310/156 |
| 4,718,380 | 1/1988 | Katayose et al. | 123/399 |
| 4,779,592 | 10/1988 | Takeuchi et al. | 123/399 |
| 4,850,319 | 7/1989 | Imoehl | 123/361 |
| 4,947,815 | 8/1990 | Peter | 123/399 |
| 4,957,274 | 9/1990 | Hood et al. | 251/129.12 |
| 5,016,586 | 5/1991 | Imamura et al. | 123/336 |
| 5,027,758 | 7/1991 | Siegler | 123/527 |
| 5,035,264 | 7/1991 | Amico et al. | 137/625.65 |
| 5,076,231 | 12/1991 | Buchl | 123/399 |

FOREIGN PATENT DOCUMENTS

| | | | |
|---|---|---|---|
| 58-135348 | 8/1983 | Japan | 123/179.16 |
| 61-252860 | 11/1986 | Japan | 123/527 |
| 1-187326 | 7/1989 | Japan | 123/527 |

*Primary Examiner*—Andrew M. Dolinar
*Attorney, Agent, or Firm*—Brooks & Kushman

[57] ABSTRACT

A carburetor assembly having a venturi element for fuel metering and a throttle valve for controlling the flow of an air and natural gas mixture to the combustion chamber of an internal combustion gas engine wherein a stepper motor is used to angularly position a throttle valve plate in the gas flow path to the carburetor, the throttle valve plate being carried on a throttle valve shaft that forms an extension of the armature of the stepper motor wherein provision is made for sealing the stepper motor at a location on the axis of rotation of the throttle valve element, the throttle valve shaft being mounted without the necessity for using throttle valve shaft bearings or a separate seal, thereby minimizing friction and any tendency for a misalignment to occur.

6 Claims, 5 Drawing Sheets

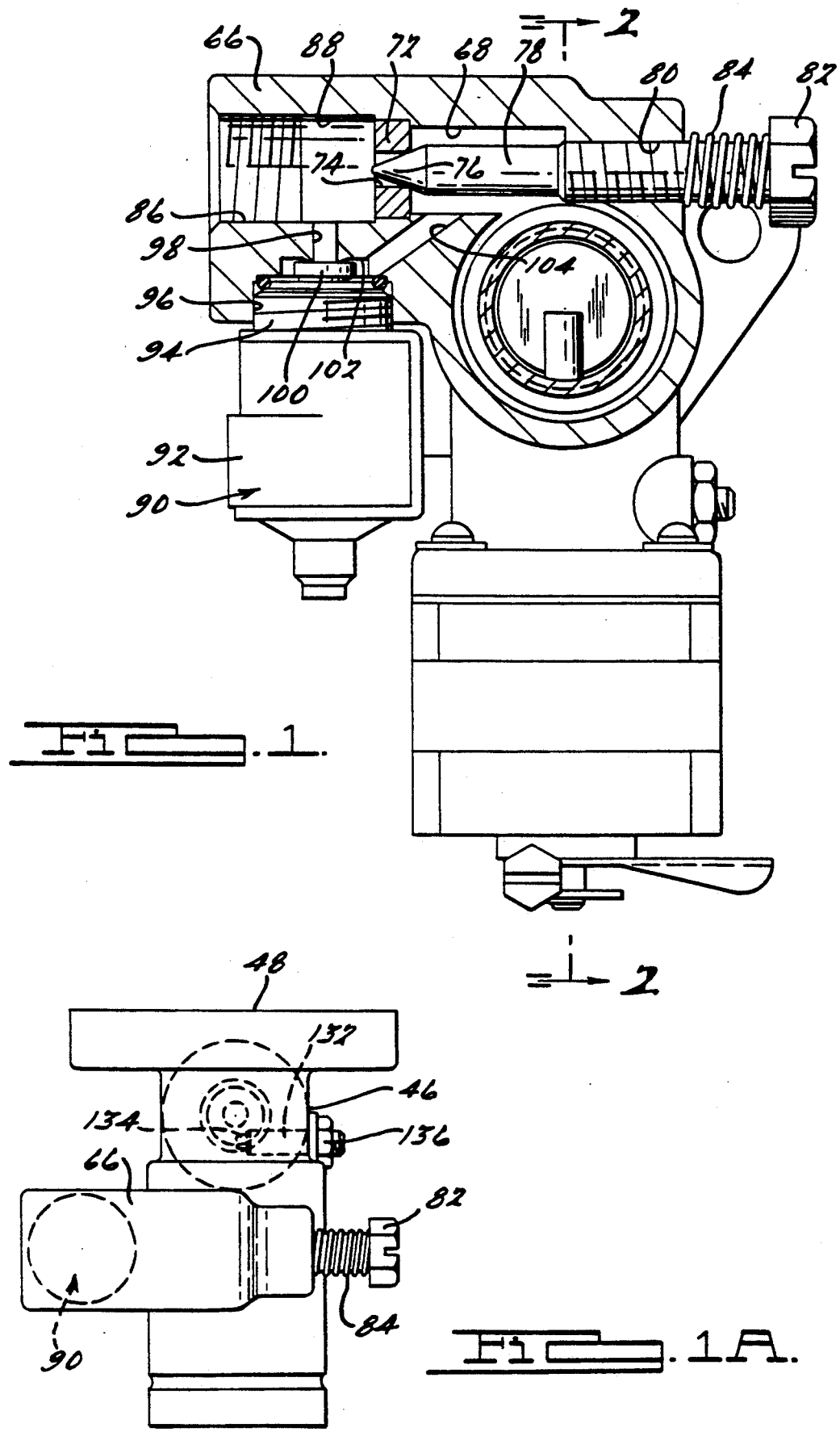

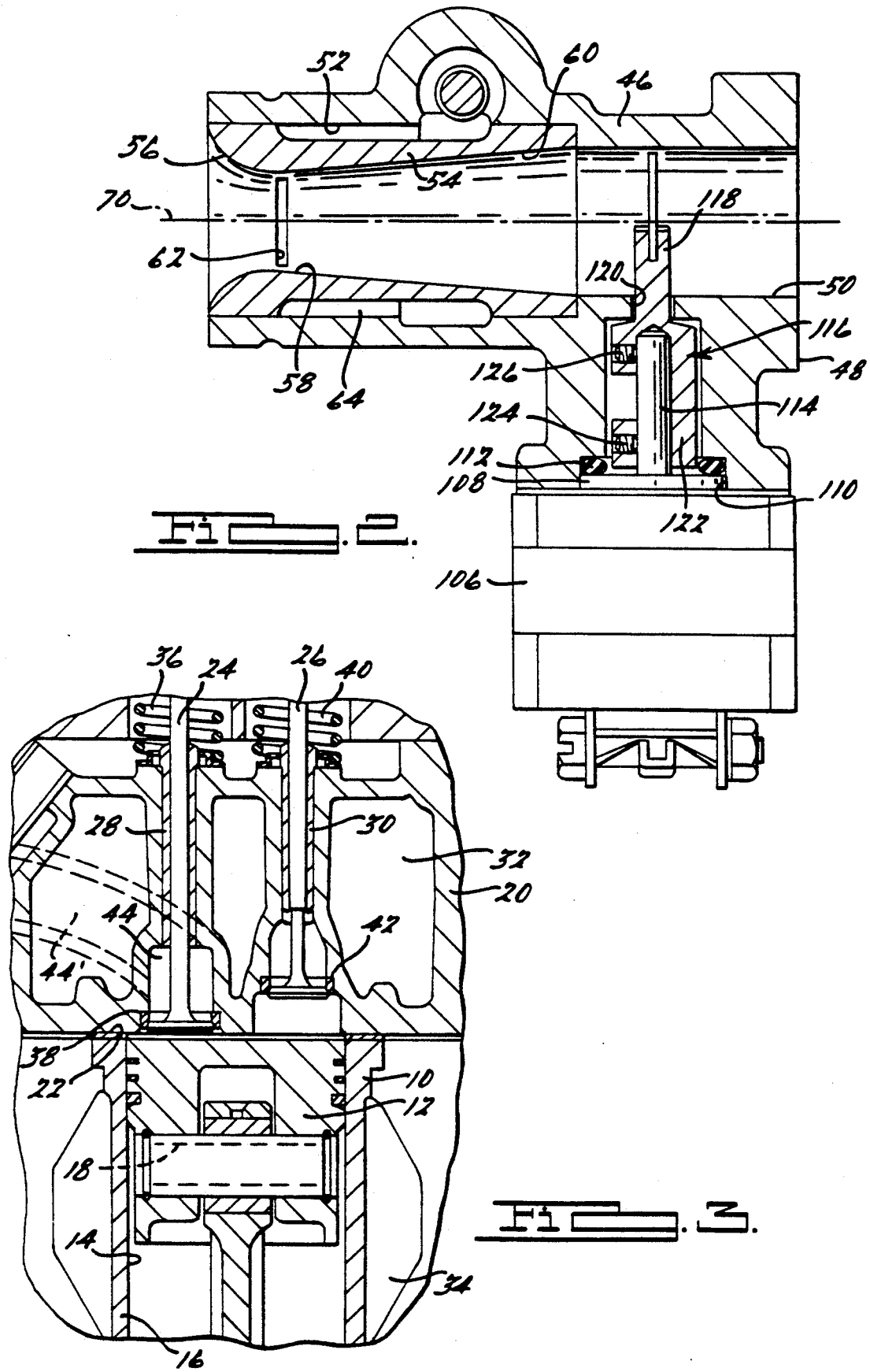

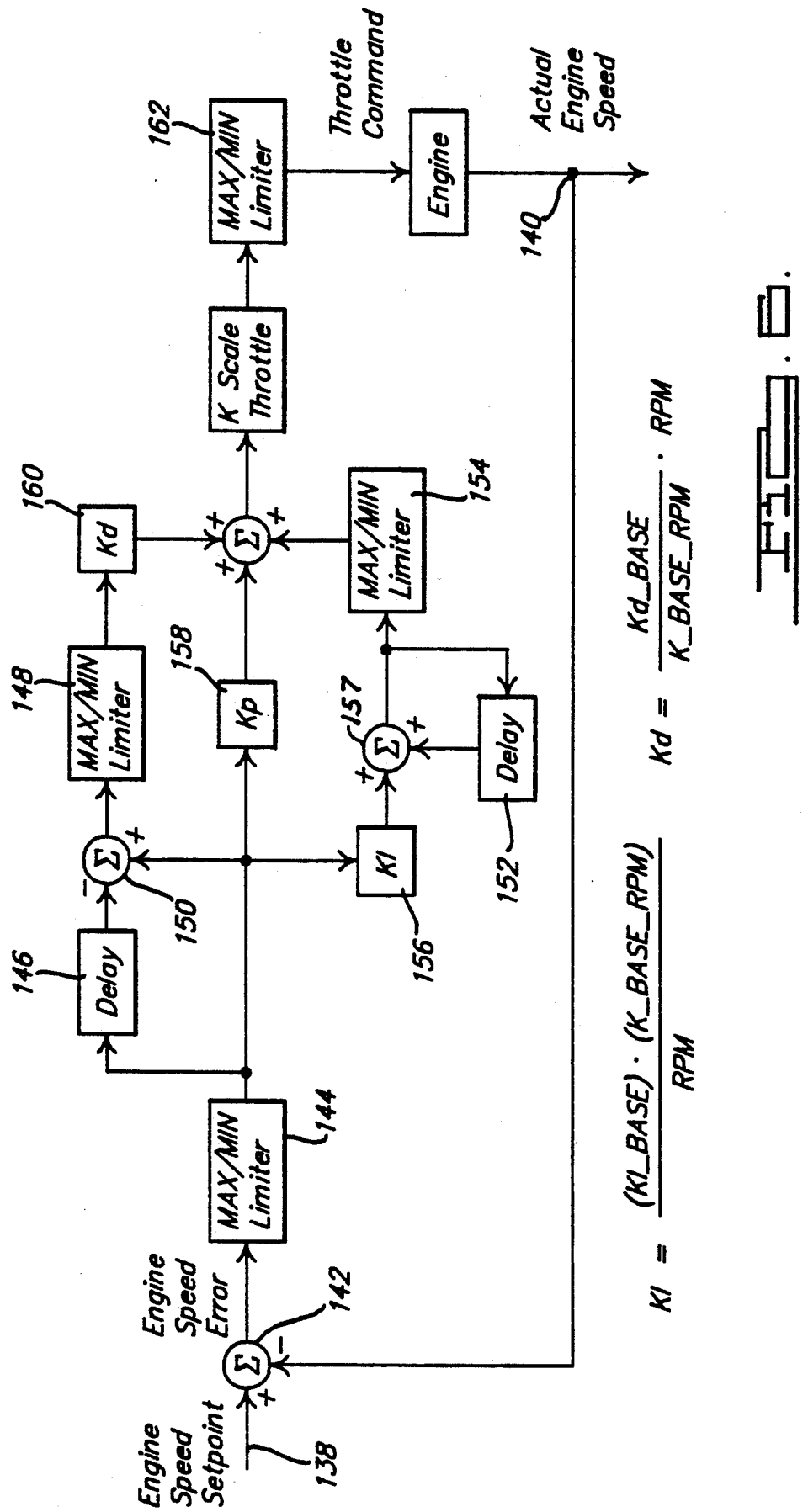

CARBURETOR ASSEMBLY FOR AN INTERNAL COMBUSTION GAS ENGINE

TECHNICAL FIELD

Our invention relates generally to internal combustion engines using natural gas as a fuel and to improvements in a carburetor for developing a combustible mixture of natural gas and air for an internal combustion gas engine.

BACKGROUND ART

It is common practice in the art of internal combustion engines to provide an air/fuel mixture carburetor having a throttle plate situated in a throttle body in the path of flow of a combustible air/fuel mixture. The throttle valve element is located on the downstream side of a venturi which develops a venturi pressure at its throat to facilitate distribution of fuel to the intake air. In the case of a liquid fuel carburetor, atomization occurs at the point of entry of the fuel into the carburetor throat. In the case of a carburetor assembly for a natural gas engine, atomization, of course, is not required; but the negative pressure developed at the throat of the venturi is used to obtain a flow of natural gas in the region of the venturi throat where it may mix with intake air. The resulting air/fuel mixture flow is controlled by the throttle plate at a point downstream from the venturi section.

It is usual practice in carburetor assemblies of this type to control the position of the throttle plate by means of a throttle plate actuator gear train or a complex throttle linkage mechanism which would be under the control of an operator-controlled throttle element.

Attempts have been made in prior art designs to simplify the throttle linkage mechanism by using a direct-drive connection between the throttle valve lever and the throttle plate so that an intervening gear train or throttle linkage is not required. This substantially reduces cost, reduces complexity of design, and improves reliability.

An example of a direct-acting throttle valve plate and plate actuator assembly is shown in prior art U.S. Pat. No. 4,779,592 wherein a stepper motor under the control of an electronic processor for an internal combustion engine is connected directly to a throttle shaft to which is secured a throttle plate located in an air intake passage for an internal combustion engine. The throttle plate is carried by a throttle shaft that is journalled and supported on the wall of the air intake passage. The throttle plate is fixed to the shaft so that no adjustment of the throttle blade with respect to the shaft may occur. The shaft is connected also to an accelerator pedal by a throttle linkage mechanism so that, as the accelerator pedal is depressed, appropriate throttle blade adjustments are made.

An electronic control system in the system disclosed in the '592 patent is adapted to detect vehicle wheel slip if the vehicle is running on a low friction surface. When slip is detected, an appropriate signal is developed by the microprocessor to adjust the stepper motor to compensate for the slip and to reduce the throttle setting, thus reducing engine torque in order to reduce the degree of wheel slip in a transient fashion. After the slip condition is avoided, the stepper motor will respond to a change in the magnitude of the slip signal by adjusting the throttle blade to the original position determined by the accelerator pedal position selected by the operator.

Other examples of a remote operator for a throttle blade are shown in U.S. Pat. Nos. 4,850,319 and 5,003,948 wherein a throttle blade for a carburetor for an internal combustion engine is actuated by an electronic throttle actuator directly connected to the throttle blade. The actuator of these prior art designs is in the form of a stepper motor which can adjust the throttle blade angle throughout a wide range of positions between a wide open-throttle position and a closed-throttle position. A throttle blade is located in the flow path for the air/fuel mixture and the blade is fixed to the shaft. The shaft itself is mounted in bearings located on opposite sides of the air flow passage.

BRIEF DESCRIPTION OF THE INVENTION

Our invention comprises improvements in carburetors adapted especially for use in a venturi-type carburetor throat wherein the venturi throat develops a negative pressure as air is induced through the air intake valve during operation of an internal combustion engine. This creates a controlled flow of natural gas through a gas flow mixture valve. A throttle plate is located on the downstream side of the venturi section of the carburetor. The throttle plate is carried by a throttle shaft. The throttle plate is connected to the shaft by a mechanical connection that accommodates a controlled amount of free play of the throttle plate with respect to the shaft to avoid any interference problems that may be caused by misalignment of the shaft relative to the carburetor body. This construction makes it possible to reduce clearances between the throttle place and the carburetor body without causing interference in throttle plate movement. Leakage of air into the air/fuel mixture, furthermore, is prevented by the absence of a throttle shaft and shaft bearings in the air flow path.

A stepper motor mechanism is secured to the carburetor throttle body. The armature of the stepper motor is connected to the throttle shaft by a direct connection in the form of a coupling sleeve without the necessity for using a separate bearing for either the armature shaft or the throttle shaft. Further, our design eliminates the need for providing a running seal on either the stepper motor shaft or the throttle shaft. In this way, the throttle setting can respond accurately to input signals delivered to the stepper motor. Throttle friction, which could cause loss of control stability, is avoided. No compensation for shaft seal friction is required and no compensation for bearing friction is required because neither shaft seals nor shaft bearings are used.

Our improved carburetor assembly includes also an electronically-controlled mixture enrichment valve situated in the carburetor assembly at a location adjacent the venturi element in parallel disposition with respect to the gas flow path extending to the venturi section. The enrichment valve responds to engine oil temperature to provide a parallel flow path for the fuel that enters the venturi section when the temperature is low. This permits the fuel mixture to approach a stoichiometric condition to facilitate starting and to reduce the energy requirements for the ignition device in the engine cylinder head. When the temperature is higher than a predetermined value, the temperature-responsive enrichment valve will close the bypass flow path, thereby establishing a desired lean mixture for normal engine operation.

The enrichment valve may respond to coolant temperature as well as oil temperature.

BRIEF DESCRIPTION OF THE DRAWINGS

FIG. 1 is a partial cross-sectional view of a carburetor assembly incorporating the improvements of our invention.

FIG. 1A is a side elevation view of the assembly shown in FIGS. 1 and 2.

FIG. 2 is a cross-sectional view taken along the plane of section line 2—2 of FIG. 1.

FIG. 3 is a view of typical internal combustion engine cylinder head assembly showing an intake valve and an exhaust valve.

FIG. 6 is a schematic circuit drawing of the throttle closed-loop control for the carburetor of FIGS. 1 and 2.

PARTICULAR DESCRIPTION OF THE INVENTION

Figure 4:
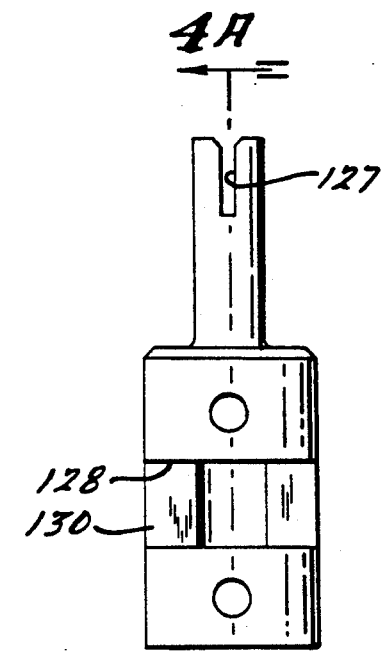
FIG. 4 is a detailed view of the throttle shaft for the throttle blade shown in the assembly views of FIGS. 1 and 2.

FIG. 3 shows in cross-section a crankcase and cylinder housing and a cylinder head for an internal combustion engine. The crankcase and cylinder housing is shown at 10. A piston 12 is positioned in cylinder 14 formed in the housing 10. It is connected by a piston rod 16 to a crankshaft (not shown). Piston rod 16 is connected to the piston by means of a wrist pin 18.

A cylinder head 20 is bolted to the upper face 22 of the housing 16. An air/fuel mixture intake valve 24 and a combustion gas exhaust valve 26 are positioned in the cylinder head above the piston. Valve 24 slides in a valve sleeve 28. A corresponding valve sleeve 30 is provided for the exhaust valve 26. Liquid coolant passages 32 are formed in the cylinder head, and liquid coolant passages 34 are formed in the housing 10.

Valve spring 36 normally seats valve 24 against valve seat 38. Valve spring 40 normally seats the valve 26 against valve seat 42.

The space above the piston and below the valves 24 and 26 is a combustion chamber which receives a combustible air/fuel mixture through the intake valve 24.

An intake flow passage 44 is closed by the valve 24 when the valve 24 assumes the position shown in FIG. 3. Passage 44 is formed in the cylinder head 20 and extends transversely with respect to the axis of the valve 24 as seen in FIG. 3 at 44'.

A carburetor assembly is shown in FIG. 2. It includes a throttle body 46 having a mounting face 48 which can be bolted to the side of the cylinder head 20 so that passage 44' will communicate with fuel mixture flow passage 50. The throttle body is provided with a cylindrical opening 52 in alignment with the passage 50. It receives a venturi element 54 as shown in FIG. 2.

The venturi element 54 comprises a flow inlet section 56, a throat section 58 and a diffuser section 60. The diameter of the diffuser section progressively increases until it matches the diameter of the flow passage 50. An inlet air flow passage (not shown) can be received over the outside diameter of the throttle body 46. An air filter can be included in the air intake conduit.

Gas fuel supply ports 62 are provided at the throat 58 of the venturi section 54. Surrounding the venturi section 54 is an annular space 64 which communicates with the ports 62.

As seen in FIG. 1, the throttle body 46 includes an enlarged section 66 in which is formed a gas flow passage 68 extending in a direction transverse with respect to the axis 70 of the passage 50.

A fuel metering orifice plate 72 located in the fuel flow passage 68 contains an orifice 74 which registers with a needle valve element 76 carried by valve stem 78, which is threaded in a threaded opening 80 formed in the throttle body 46. The head 82 of the stem 78 can be adjusted to control the effective flow area of the orifice 74. Valve spring 84 maintains a proper adjustment of the valve stem 78 once it is set at a calibrated position.

A natural gas supply conduit (not shown) can be threaded at 86 in the portion 88 of the flow passage 68 upstream from the orifice 74.

A fuel enrichment valve assembly 90 includes a solenoid body 92 having a threaded extension 94 that is received in a threaded opening 96 in the throttle body 46. A bypass port 98 communicates with the passage portion 88. A valve element 100 carried at the end of the armature of solenoid valve 90 is adapted to normally close the port 98 as indicated in FIG. 1.

Valve element 100 is situated in a valve chamber 102, and a bypass passage 104 communicates with the chamber and with flow passage 68 on the downstream side of the orifice 74. Thus, when the solenoid is energized, valve element 100 opens passage 98 to establish communication across the orifice 74. This provides a parallel gas flow passage to the engine intake valve and enriches the mixture for starting the engine when the coolant temperature is low.

An electric stepper motor 106, as seen in FIG. 2, is bolted to the throttle body 46. It includes a housing having an extension 108 received in opening 110 in the throttle body 46. A fluid seal, preferably an O-ring type seal, is situated between the extension 108 and the surrounding wall of the opening 110 as shown at 112.

The stepper motor comprises an armature shaft 114 which is received within a throttle blade shaft assembly 116, as best seen in FIG. 2.

A throttle shaft 118 forms a part of the throttle shaft assembly 116 and extends through opening 120 in the throttle body so that the shaft 118 can extend within the passage 50. Shaft assembly 116 includes also a sleeve 122 received over the armature shaft 114. It is held in place by set screws 124 and 126 received in threaded openings formed in the sleeve 122.

Figure 4A:
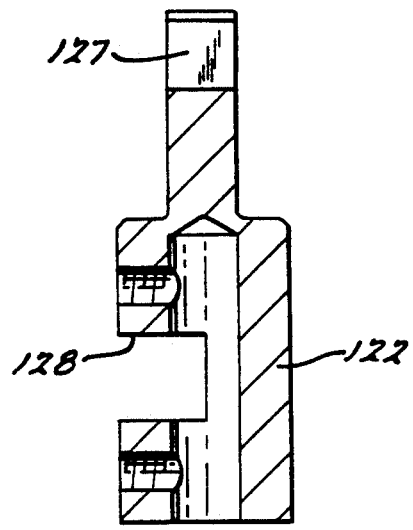
FIG. 4A is a cross-sectional view of the assembly of FIG. 4.
Figure 5:
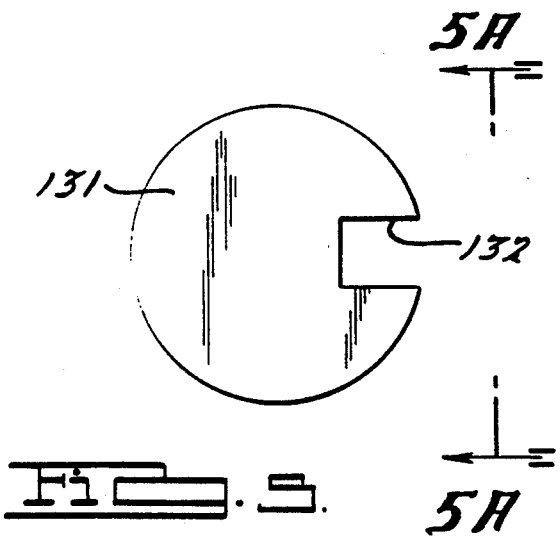
FIG. 5 is a detail plan view of a throttle blade for the carburetor assembly of FIGS. 1 and 2.
Figure 5A:
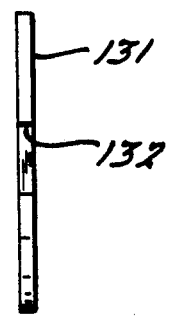
FIG. 5A is an end view of the throttle blade as seen from the plane of section line 5A—5A of FIG. 5.

The end of the shaft assembly portion 118 is slotted as shown in FIGS. 4 and 4A. The slot is identified by reference numeral 127. Throttle plate 130, as seen in FIGS. 5 and 5A, is circular and is provided with a recess 132. The recess 132 registers with the slot 127, thereby establishing a loose, lost-motion connection between the shaft 118 and the throttle plate 130.

The diameter of the throttle plate 130 is slightly less than the diameter of the passage 50 to avoid interference.

The sleeve portion 122 is provided with a transverse slot 128 as seen in FIGS. 4 and 4A. A wall 130 of the slot 128 is adapted to engage a stop in the form of a set screw 132 as seen in FIG. 1A. The set screw 132 is threadably received in an opening formed in the throttle body 46. Its inner end 134 is adapted to engage wall 130 of the slot 128 when the throttle blade assumes a closed position. The contact between the stop and the contact wall 130 is normal to the direction of motion so no friction resistance or binding action is developed when the throttle blade is adjusted to its closed position. The outer end of the adjustable set screw 132 extends outwardly from the throttle body 46 and may be adjusted by a hand tool. A lock nut 136 threaded on the adjustment screw 132 holds the screw 132 in place after adjustment is completed.

By eliminating the need for a separate throttle shaft and bearings, friction is minimized as the throttle plate is adjusted by the stepper motor. The possibility of misalignment or binding of the throttle plate within the passage 50 is eliminated.

The engine throttle control scheme is illustrated in the block diagram of FIG. 6. It includes a digital proportional-integral-derivative control algorithm in order to regulate the speed of the engine. The engine speed set point, which is established by the engine controller, is determined at 138. The actual engine speed is measured at 140. This is done by using a camshaft speed sensor for the engine of FIG. 3. The speed error is determined at the summing point 142 shown in FIG. 6.

The PID controller is inserted into the control loop of FIG. 6 as part of the forward gain of the control system. By controlling the gain, the response of the controller to an error signal can be modified so as to produce a required system response.

The speed error signal is first applied to a MAX/MIN limiter 144. The output from this block is processed in three parallel paths to implement the PID logic. Proportional control is accomplished by multiplying the speed error signal by a constant term $K_P$ in block 158. The result is a signal proportional to speed error.

Derivative gain is provided to improve stability and transient response. The derivative logic is implemented by elements 146, 150, 148 and 160. The summing junction 150 computes the rate of change of the speed error by subtracting the speed error computed during the previous engine cycle (output of delay element 146) from the current value of speed errors. The output is applied to a MAX/MIN limiter 148 and then multiplied by a derivative gain term $K_D$ at 160. The output of the derivative loop is a signal proportional to the rate of change of the speed error.

Integral gain, provided to minimize the steady-state error, is implemented by elements 156, 157, 152 and 154. In block 156, the speed error is multiplied by an integral gain term $K_I$. The result is applied to summing junction 157 where it is added to the cumulative value from previous cycles, which is the output of delay element 152. The result from the summing junction is then applied to MAX/MIN limiter 154. The output of the integral loop is a signal proportional to the value of the speed error integrated over time.

The outputs from the three loops are combined in a summing junction, multiplied by a scaling factor and applied to a MAX/MIN limiter 162 which limits the range of travel of the throttle valve. The result is then applied to the stepper motor controller.

The computations in the PID loops are executed once for each engine cycle. As a result, the derivative and integral gains are affected by engine speed. To compensate for this effect, the integral gain term $K_I$ and the derivative gain term $K_D$ are made to vary with engine speed according to the equations at the bottom of FIG. 6.

If desired, the maximum and minimum limiter circuit 162 can be used to avoid the extremes in the engine throttle command before the command is passed through to the engine throttle stepper motor. The stepper motor for adjusting the throttle may be a 400-stepper-revolution stepper motor which steps at a rate of 800 steps per second.

Figure 7:
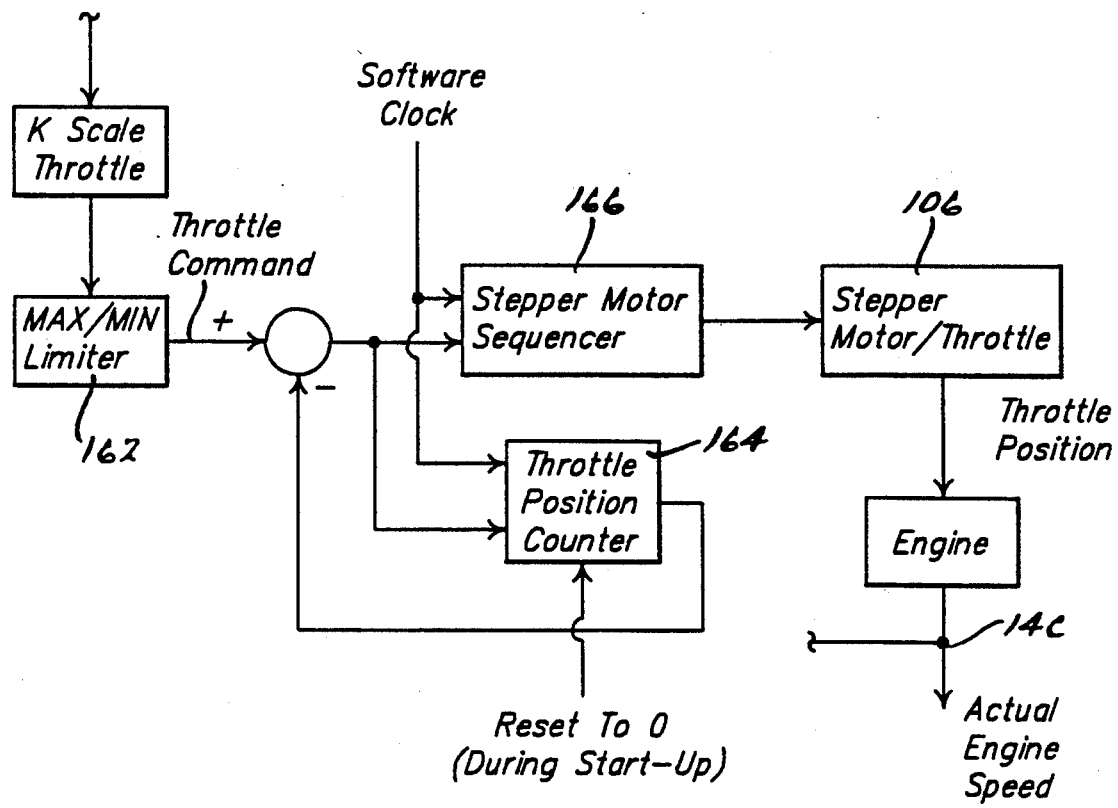
FIG. 7 is a block diagram of a secondary control loop within the closed-loop control of FIG. 6 for incrementing or decrementing the throttle position after a throttle position command is developed in the FIG. 6 sequence.

FIG. 7 shows a secondary open-loop control for the throttle. The control of FIG. 7 is under the control of a software clock, which is a function of the throttle control processor.

A throttle position counter 164 receives control ticks from the software clock, and that count value is compared to the throttle command received from the maximum/minimum limiter 162. During start-up, the counter 164 is reset to zero as part of a start-up routine. The stepper motor sequencer 166 will respond to any error in the throttle position with respect to the throttle command and cause the stepper motor shown at 106 to increment or decrement.

Figure 8:
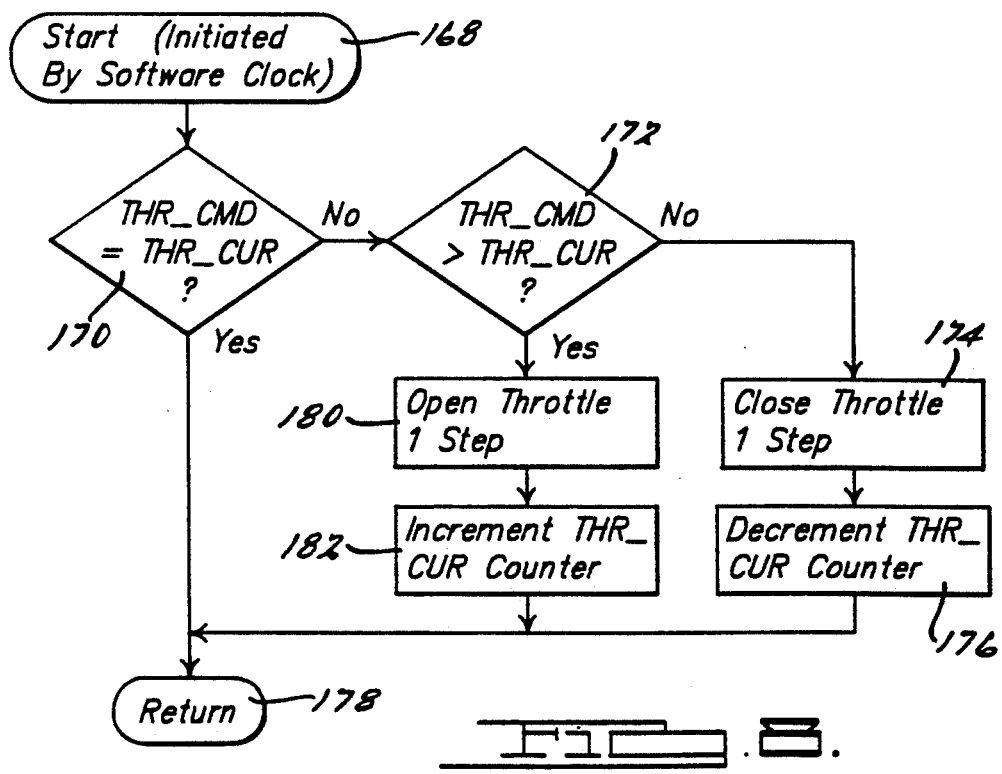
FIG. 8 is a flow chart showing the throttle control logic carried out by the electronic processor for the throttle control as the functions of the control of FIG. 7 are executed.

FIG. 8 shows the control logic for effecting the throttle adjustments. After the start-up routine at 168 a test is made at the next step in the control loop as shown at 170. During the start-up routine, the current throttle position counter (THR-CUR) is set to zero. The test at 170 determines whether the commanded throttle position (THR-CMD) is equal to the current throttle position. If these values are not equal, the routine proceeds to step 172 where an inquiry is made to determine whether the commanded throttle position is greater than the current throttle position. If THR-CMD is not greater than THR-CUR, the stepper motor will be actuated one step toward a closed-throttle position at step 174. The counter 164 then is decremented one count at step 176 before the routine returns at 178.

If the test at 172 is affirmative, the sequencer 166 will cause the stepper motor 106 to advance one step toward the open-throttle position. This occurs at step 180. The counter 164 then is incremented once at step 182 before the routine returns at 178.

Having described a preferred embodiment of our invention, what we claim and desire to secure by United States Letters Patent is:

1. A carburetor for a gas engine comprising a throttle body, an air inlet passage in said throttle body adapted to communicate with an air/fuel mixture inlet flow conduit;

a shaft opening in said throttle body extending in a direction transverse to said inlet passage;

an electric actuator motor mounted in said throttle body on the exterior thereof and having an armature shaft extending into said shaft opening;

a throttle blade shaft in said shaft opening;

a throttle blade in said inlet flow conduit, a mechanical connection between said throttle blade and said throttle blade shaft whereby rotary adjustment of said throttle blade shaft by said motor effects opening and closing of said inlet flow conduit; and said throttle blade shaft being carried by and driven by said armature shaft and being supported entirely by said armature shaft.

2. The combination as set forth in claim 1 wherein said motor has a mounting shoulder formed thereon in registry with said throttle shaft opening and a seal surrounding said throttle blade shaft adjacent said shoulder whereby said throttle shaft opening is effectively sealed from said exterior thereby eliminating friction between said throttle blade shaft and said throttle body.

3. The combination as set forth in claim 1 wherein said carburetor comprises a fuel metering orifice, a venturi element in said inlet passage, fuel metering passage means in said throttle body communicating with said venturi element, said fuel metering passage means being adjusted to supply combustible gas to said venturi element.

4. The combination as set forth in claim 3 wherein said engine has liquid coolant passages and said carburetor comprises an air/fuel mixture enrichment passage in said throttle body that bypasses said orifice, and a solenoid operated valve means for opening and closing said enrichment passage in response to coolant temperature changes.

5. The combination as set forth in claim 2 wherein said carburetor comprises a fuel metering orifice, a venturi element in said inlet passage, fuel metering passage means in said throttle body communicating with said venturi element, said fuel metering passage means being adjusted to supply combustible gas to said venturi element.

6. The combination as set forth in claim 1 wherein said mechanical connection is a lost-motion connection comprising means for accommodating adjustment of said throttle blade relative to said throttle blade shaft whereby interference between said throttle body and said throttle blade is avoided as said motor adjusts said throttle blade shaft.

* * * * *